United States Patent [19]

Hunt

[11] 3,816,135

[45] June 11, 1974

[54] DIRECT POSITIVE SILVER HALIDE EMULSIONS THROUGH SYNERGISTIC EFFECTS OF FOGGING AGENTS AND ORGANIC REDUCING AGENTS AND/OR THEIR OXIDIZED FORMS

[75] Inventor: Heman Dowd Hunt, Webster, N.Y.

[73] Assignee: E. I. du Pont de Nemours and Company, Wilmington, Del.

[22] Filed: Mar. 30, 1972

[21] Appl. No.: 239,734

[52] U.S. Cl............................ 96/64, 96/107, 96/108
[51] Int. Cl............................ G03c 5/24, G03c 1/28
[58] Field of Search .................. 96/64, 94, 107, 108

[56] References Cited
UNITED STATES PATENTS

| | | | |
|---|---|---|---|
| 2,500,140 | 3/1950 | Teal et al. | 96/108 |
| 3,560,213 | 2/1971 | Hunt | 96/64 |

Primary Examiner—Norman G. Torchin
Assistant Examiner—Won H. Louie, Jr.

[57] ABSTRACT

High-speed direct positive silver halide emulsions characterized by improved densities and highlights are prepared containing a combination of a strong inorganic chemical fogging agent and an organic reducing agent and/or its oxidized form taken from the group consisting of methyl-p-aminophenol (metol), hydroquinone, quinone, quinhydrone, 1,4-naphthalenediol and 1,5-naphthalenediol, and an alkali metal sulfite, said combination being in an inert environment where it is unable to cause the formation of chemical fog centers or sensitivity centers on the silver halide grain surfaces before exposure and processing. Such an environment can be established by adjusting the pH range between 4.9 and 6.5.

11 Claims, No Drawings

3,816,135

DIRECT POSITIVE SILVER HALIDE EMULSIONS THROUGH SYNERGISTIC EFFECTS OF FOGGING AGENTS AND ORGANIC REDUCING AGENTS AND/OR THEIR OXIDIZED FORMS

BACKGROUND OF THE INVENTION

1. Field of the Invention

The invention pertains to camera speed photographic silver halide emulsion layers capable of forming a direct positive image by means of a latent image forming exposure and one-step processing, the silver halide emulsion of which contains a combination of a strong inorganic chemical fogging agent and an organic reducing agent and/or its oxidized form in an inert environment which can be activated by pH adjustment.

2. Description of the Prior Art

The prior art on direct positive emulsion includes Hunt, U.S. Pat. No. 3,033,678, issued May 8, 1962, relating to light-developable, direct-print emulsions which contain stannous chloride. These emulsions do not contain methyl-p-aminophenol (metol), hydroquinone, quinone or quinhydrone during the addition of the stannous chloride. In a related patent to Hunt, U.S. Pat. No. 3,189,456, issued June 15, 1965, an optical sensitizing dye is added to the emulsion but the stannous salt is not in combination with an organic reducing agent. In a related patent to Hunt, U.S. Pat. No. 3,560,213, issued Feb. 2, 1971, there are described direct positive emulsions in which stannous salts are used as the sole chemical fogging agent.

At page 161 of *The Theory of the Photographic Process*, Third Edition, C. E. K. Mees and T. H. James, The Macmillan Co., New York, an effect called "Internal-Image Desensitization" is discussed which, it is believed, may aid in understanding the present invention. As discussed therein, suitable emulsions may be exposed and treated so as to make them capable of forming surface latent image and re-exposed uniformly to give a positive image due to the imagewise desensitization of the emulsion grains to surface latent-image formation by the initial internal latent image. The second exposure may be replaced by fogging the emulsion chemically, and the novel emulsions of the invention function in this manner. Chemical fogging is described in Fallensen, U.S. Pat. No. 2,497,875, issued Feb. 21, 1950, and addition of materials, e.g., benzotriazole, to restrain growth of the negative, is disclosed in Stauffer, U.S. Pat. No. 2,497,917, issued Feb. 21, 1950. None of these references, however, teaches the incorporation into the emulsion of a combination of an inorganic chemical fogging agent and at least one organic reducing agent or its oxidized form taken from the group consisting of methyl-p-aminophenol (metol), hydroquinone, quinone, quinhydrone, 1,4-naphthalenediol and 1,5-naphthalenediol and an alkali metal sulfite so that they are inert with respect to the silver halide grains at all times before processing.

SUMMARY OF THE INVENTION

This invention relates to a light-sensitive, photographic silver halide emulsion containing an inorganic chemical fogging agent, at least one organic reducing agent or its oxidized form selected from the group consisting of methyl-p-aminophenol (metol), hydroquinone, quinone, quinhydrone, 1,4-naphthalenediol and 1,5-naphthalenediol, and an alkali metal sulfite, said emulsion having a pH at which chemical fog centers are not formed.

The invention also relates to a process for forming a direct-positive image:

1. by imagewise exposing the above-defined silver halide emulsion layer, and
2. by treating the exposed layer to change the pH of the system so that the combination of inorganic chemical fogging agent and organic reducing agent in the presence of silver halide grains is no longer inert with respect to said grains and is able to cause the formation of fog centers on the surfaces of unexposed silver halide grains. Step (2) can be accomplished by developing the unexposed grains by treatment with an alkaline, photographic silver halide developing solution which raises the pH so that the inorganic chemical fogging agent and organic reducing agent become active and have a fogging action on the unexposed silver halide grains. Preferably, air is bubbled through the solution during development.

The direct positives are obtained in accordance with this invention by the activation of the combination of the inorganic chemical fogging agent and the organic reducing agent, so that the unexposed silver halide grains become chemically fogged so as to become developable without the addition of the other fogging agents or additional exposures as required by the prior art references.

DESCRIPTION OF THE PREFERRED EMBODIMENTS

In carrying out this invention, an inorganic chemical fogging agent such as a stannous salt is incorporated in a silver halide emulsion in combination with at least one organic reducing agent or its oxidized form taken from the group consisting of methyl-p-aminophenol (metol), hydroquinone, quinone, quinhydrone, 1,4-naphthalenediol, and 1,5-naphthalenediol, and from 5 to 15 mole percent of an alkali metal sulfite while maintaining the pH of the emulsion so that the combined ingredients are inert from the time of their addition until after completion of imagewise exposure. The inert environment can be maintained by adjusting and keeping the pH of the emulsion between 4.9 and 6.5. In the preferred embodiments a stannous salt is used in quantities of from 0.001 to 100 mole percent and the organic reducing agent is present in amounts of from 0.2 to 50 mole percent and preferably from 1 to 10 mole percent, based on the silver halide.

For the best results, the photosensitive layers should be of an "internal latent image" emulsion which comprises silver halide grains having a substantial amount (preferably a predominant amount) of sensitivity internal to the grain. Such emulsions are discussed in Chapter 6 of the above-cited Mees and James textbook which refers to developer formulae for "surface type" photographic developer solutions along with discussions of typical behavior of "internal latent image" emulsions in various developer formulations. Those skilled in the art of manufacturing photographic emulsions are familiar with the various means of increasing the ratio of internal to surface sensitivity, including the minimizing of chemical sensitization of the silver halide surface.

In a preferred embodiment of the invention, the emulsion should include a protective agent which adsorbs to the surface of the silver halide grain and diminishes the opportunity for the chemical fogging agent in its required environment to react with the silver halide grain. Pronounced effects can be obtained with the addition of protective agents such as metal iodides. These agents are helpful in preventing development of silver halide in exposed areas so as to give better minimum densities and, therefore, improved visual contrast and clarity.

While inert gelatin is the preferred binding agent for the silver halide grains, other natural and synthetic water-permeable macromolecular organic colloid binding agents can be substituted for gelatin. The specific colloid binding agents described in Hunt, U.S. Pat. No. 3,033,682 can be used in accordance with this invention.

Suitable chemical fogging agents are inorganic metal compounds, including stannous chloride, stannous fluoride, stannous fluoroborate, titanium chloride and others which during development cause fogging of silver halide grains having no latent images but do not fog grains containing an internal latent image.

Other agents, e.g., lead salts, may be added during the digestion period to promote fogging.

The emulsions may contain any of the usual adjuvants such as coating aids, hardening agents, viscosity modifiers, matting agents, pigments, nonhalation dyes, covering power agents, dispersed polymeric latices, e.g., chemical sensitizers may be present although in preferred emulsions these are omitted so the surface sensitivity will be minimized relative to that of the internal sensitivity.

The emulsion can be coated on any suitable support, e.g., those disclosed in Nottorf, U.S. Pat. No. 3,142,568. The elements prepared from these emulsions may also comprise various auxiliary layers disclosed in the Nottorf patent.

The invention will be further illustrated but is not intended to be limited by the following examples wherein, unless otherwise stated, silver halide coating weights are calculated in terms of the equivalent weight of pure silver bromide.

EXAMPLE I

A gelatino-silver-chlorobromide emulsion was prepared by precipitating silver chloride crystals in an acidified, aqueous, gelatin solution and then the emulsion was ripened in the presence of 1.6 moles of potassium bromide per mole of silver chloride. The silver halide crystals thus prepared were of the type having a strong tendency to form internal latent images. After coagulation washing to remove soluble salts, as taught in Moede, U.S. Pat. No. 2,772,165, the emulsion was found to contain silver halide which was about 94 mole percent silver bromide and about 6 mole percent silver chloride. The washed emulsion was redispersed in an aqueous gelatin solution of such concentration that the resultant emulsion contained approximately 400 g. of gelatin per mole of the silver halide. The emulsion was digested for 45 minutes at 110°F. Subsequently there were added, based on the silver halide, 4 mole percent plumbous nitrate, 1 mole percent of potassium iodide, 206 ml. of solution containing 0.5 gram of the optical sensitizing dye: 5[(1-butyl-6-methyl-2(1)-benzothiazylidene]-2-thio-2, 4(3,5)-oxazoledione in 500 ml. of acetone and 1000 ml. of ethanol, and an aqueous solution containing 10.6 mole percent of sodium sulfite, 10.0 mole percent of metol sulfate and sufficient sulfuric acid to give a pH of 6.0. A solution of quinhydrone (10.7 grams in 267 ml. acetone W/V) was added and the pH adjusted to 5.6, and finally 1 mole percent, based on silver halide, of stannous fluoroborate was added. Chrome alum hardener was added and the emulsion having a pH of 5.0 was coated to give a coating weight of 50 mg. of silver bromide per square decimeter on a photographic quality cellulose triacetate film base.

A strip of the material was exposed by an Edgerton, Germenshausen and Grier, Inc. sensitometer, Model VI, through a photographic step wedge which differed in optical density by a factor of 2 between adjacent steps for 1/100th second using a xenon flash filtered to 23 meter-candle-seconds. The exposed strip was developed in the following composition:

| | | |
|---|---|---|
| Sodium sulfite (anhyd.) | 30 | grams |
| Metol (methyl-p-aminophenol) | 5 | grams |
| Sodium carbonate monohydrate | 8 | grams |
| Benzotriazole | 0.2 | gram |
| Diethylenetriamine penta-acetic acid | 5.0 | grams |
| Water to make | 1.0 | liter. |

The pH was 9.8 and development time was for 2 minutes at 80°F., with air continuously bubbling through the solution. The strip was immersed for 10 seconds in a stop bath at pH 4.5 of acetic acid followed by 2 minutes in commercial acid, white alum fixing solution (Du Pont 20F Fixing Bath, Photo Lab Index, page 5–26, 1959), and finally the strip was given a 5-minute wash in tap water and dried.

The following sensitometric data for the positive image were obtained:

| | | |
|---|---|---|
| Maximum Density | 1.09 | |
| Minimum Density | .09 | (Base + $D_{min}$ |
| Exposure to give clean $D_{min}$ | 6.0 | meter-candle-sec. |
| Exposure to give shoulder | 0.1 | meter-candle-sec. |
| Relative speed | 2.42 | |

EXAMPLE II

An emulsion was prepared as described in Example I up through the step of adding the sensitizing dye. The emulsion was then divided into three portions A, B and C and the compositions based on 1 mole of silver halide prepared by addition as indicated in the following table:

| Coating | A | B | C |
|---|---|---|---|
| Water (ml) | 667 | 667 | 667 |
| Sodium sulfite (grams) | 6.67 | 6.67 | 6.67 |
| Metol sulfate (grams) | 8.65 | 8.65 | 8.65 |
| Hydroquinone (grams) | 0.00 | 3.33 | 0.00 |
| Quinone (grams) | 0.00 | 0.00 | 3.33 |
| pH after addition | 6.3 | 6.4 | 6.4 |

Stannous fluoroborate (0.6 percent in 2.5 percent gelatin solution) was then added to each emulsion to give 1.1 mole percent of $Sn^{+2}$. The pH was adjusted to 5.2 and the emulsions were coated on a photographic quality polyethylene terephthalate film base of the type described in Alles, U.S. Pat. No. 2,779,684. Exposure and processing was carried out as described in Example I with the following results:

|                    | A    | B    | C    |
|--------------------|------|------|------|
| Maximum Density    | 1.87 | 1.83 | 2.75 |
| Density at Step 11 | .93  | .90  | 1.55 |
| Base + $D_{min}$   | .30  | .30  | .35  |
| Relative Speed     | 1.61 | 1.48 | 1.39 |

EXAMPLE III

Example II was repeated except that the amount of quinone was varied according to the table and quantities of all ingredients are given in grams per mole of silver halide.

|                          | A    | B    | C    | D    | E    |
|--------------------------|------|------|------|------|------|
| Sodium Sulfite           | 13.3 | 13.3 | 13.3 | 13.3 | 13.3 |
| Metol Sulfate            | 17.7 | 17.7 | 17.7 | 17.7 | 7.7  |
| Hydroquinone             | 6.7  | 6.7  | 6.7  | 6.7  | 6.7  |
| Quinone                  | 0.0  | 3.3  | 6.7  | 10.0 | 13.4 |
| pH after addition        | 6.1  | 6.4  | 6.1  | 6.1  | 6.1  |
| pH after addition of Sn Salt | 6.0 | 6.0 | 6.0 | 6.0 | 6.0 |
| pH adjusted to           | 5.2  | 5.2  | 5.2  | 5.2  | 5.2  |

Sensitometric results are as follows:

|                    | A    | B    | C    | D    | E    |
|--------------------|------|------|------|------|------|
| Maximum Density    | 1.68 | 2.40 | 2.35 | 0.24 | 0.22 |
| Density at Step 11 | 0.71 | 0.88 | 1.11 | 0.24 | 0.22 |
| Base plus $D_{min}$| 0.32 | 0.38 | 0.39 | 0.24 | 0.22 |
| Relative Speed     | 1.82 | 2.42 | 1.61 | —    | —    |

It will be seen that best results are obtained when the amount of quinone was near the amount of hydroquinone.

EXAMPLE IV

Example II was repeated using varying amounts of quinhydrone as indicated as moles per mole of silver halide in the table. In addition there were incorporated 5 mole % of metol during digestion instead of 10 mole%.

|                | A     | B     | C     | D     | E     |
|----------------|-------|-------|-------|-------|-------|
| Sodium Sulfite | 0.106 | 0.106 | 0.106 | 0.106 | 0.106 |
| Quinhydrone    | 0.000 | 0.030 | 0.045 | 0.061 | 0.076 |

Sensitometric results were as follows:

|                    | A    | B    | C    | D    | E    |
|--------------------|------|------|------|------|------|
| Maximum Density    | 1.33 | 2.59 | 2.71 | 2.50 | 1.10 |
| Density at Step 11 | 0.52 | 0.87 | 1.18 | 1.72 | 0.96 |
| Base plus $D_{min}$| 0.45 | 0.41 | 0.45 | 0.45 | 0.50 |
| Relative Speed     | 1.95 | 2.67 | 1.89 | 1.01 | 1.12 |

Equivalent results were obtained using for the B, C, D and E portions 0.061, 0.091, 0.122 and 0.132 quantities of 1:1 amounts of quinone and hydroquinone. It will be observed that lowering the amount of metol during digestion allows an undesirable increase in minimum densities or base plus fog.

EXAMPLE V

Example IV was repeated varying the amount of sodium sulfite indicated as moles/mole of silver halide. Quinhydrone was used but is considered as two molecules in the table.

|                        | A     | B     | C     |
|------------------------|-------|-------|-------|
| Sodium Sulfite         | 0.053 | 0.106 | 0.159 |
| Quinone + hydroquinone | 0.061 | 0.061 | 0.061 |

The following sensitometric data were obtained:

|                    | A     | B    | C    |
|--------------------|-------|------|------|
| Maximum Density    | 2.69  | 2.82 | 2.83 |
| Density at Step 11 | 2.24  | 1.03 | 1.20 |
| Base plus $D_{min}$| 0.50  | 0.48 | 0.57 |
| Relative Speed     | 0.662 | 2.67 | 2.32 |

This series shows that the greater the excess of sodium sulfite over quinhydrone, the faster the direct positive speed. This is indicated by comparing density at step 11 with maximum density, a greater difference means greater speed.

EXAMPLE VI

Emulsions similar to those in Examples I – V containing 5 mole percent of metol were prepared except that the solutions containing quantities of sodium sulfite and organic reducing agents or oxidized forms in moles per mole of silver halide were varied as indicated below.

|                      | A     | B     | C     | D     | E     |
|----------------------|-------|-------|-------|-------|-------|
| Sodium sulfite       | 0.106 | 0.106 | 0.106 | 0.106 | 0.106 |
| Quinhydrone          | —     | 0.030 | —     | —     | —     |
| 1,4-naphthalenediol  | —     | —     | 0.010 | —     | —     |
| 1,5-naphthalenequinone | —   | —     | —     | 0.010 | —     |
| Quinone              | —     | —     | —     | —     | 0.061 |

Sensitometric data:

|                    | A    | B    | C    | D    | E    |
|--------------------|------|------|------|------|------|
| Maximum Density    | 1.47 | 1.97 | 1.98 | 1.64 | 1.73 |
| Density at Step 11 | 0.24 | 0.48 | 1.33 | 0.86 | 0.73 |
| Base plus $D_{min}$| 0.14 | 0.17 | 0.15 | 0.11 | 0.21 |
| Relative speed     | 2.49 | 2.58 | 1.16 | 1.39 | 1.71 |

Unlike quinone and hydroquinone, when naphthalenediol and naphthalenequinone were added there was some loss of speed but good maximum and minimum densities were obtained. This speed modulation may be desirable in some cases.

EXAMPLE VII

An emulsion was prepared similar to Example VI and to the various portions there were added the quantities in moles per mole of silver halide of metol sulfate, oxidized metol sulfate, 1,4-naphthalenediol and 1,5-naphthalenediol as indicated in the table.

|  | A | B | C | D | E |
|---|---|---|---|---|---|
| Sodium Sulfite | 0.106 | 0.106 | 0.106 | 0.106 | 0.106 |
| Metol Sulfate | 0.050 | — | 0.050 | 0.050 | 0.050 |
| Oxidized Metol Sulfate | — | 0.038 | 0.038 | — | — |
| 1,4-naphthalenediol | — | — | — | 0.020 | — |
| 1,5-naphthalenediol | — | — | — | — | 0.020 |

Sensitometric Data:

|  | A | B | C | D | E |
|---|---|---|---|---|---|
| Maximum Density | 0.85 | 1.43 | 1.59 | 0.51 | 1.84 |
| Density at Step 11 | 0.30 | 0.79 | 0.89 | 0.44 | 0.46 |
| Base plus $D_{min}$ | 0.22 | 0.18 | 0.23 | 0.25 | 0.19 |
| Relative Speed | 1.71 | 1.34 | 1.34 | 1.24 | 2.41 |

Oxidized metol added with or without metol improved fog for maximum density. The compound was prepared by oxidizing to a brown color by stirring in air in absence of sulfite.

EXAMPLE VIII

An emulsion was prepared as in Example I, except for 5 mole % of metol instead of 10, and portions were treated with various amounts of sodium sulfite and quinhydrone but keeping the ratio of the two compounds constant. The levels of pH were adjusted to 5.8 before the stannous salt was added.

|  | A | B | C | D |
|---|---|---|---|---|
| Sodium sulfite | 0.106 | 0.159 | 0.212 | 0.265 |
| Quinhydrone | 0.097 | 0.145 | 0.194 | 0.242 |

| Sensitometric Results: | A | B | C | D |
|---|---|---|---|---|
| Maximum Density | 1.16 | 1.66 | 2.08 | 0.92 |
| Density at Step 11 | 0.46 | 0.70 | 0.80 | 0.69 |
| Base plus $D_{min}$ | 0.35 | 0.47 | 0.33 | 0.30 |
| Relative Speed | 1.82 | 2.48 | 2.48 | 1.24 |

EXAMPLE IX

An emulsion was prepared as described in Example I. After the redispersion step there were added gelatin to provide 175 grams per mole of silver halide, 1 mole percent of potassium iodide, 8 mole percent of plumbous nitrate, solutions of sodium sulfite and methyl-p-aminophenol sulfate to provide the grams per mole of silver halide as shown in the following table and 2 mole percent of stannous fluoroborate, all mole percents based on the silver halide.

| Coating | A | B | C | D |
|---|---|---|---|---|
| Sodium sulfite | 13.3 | 13.3 | 13.3 | 13.3 |
| Methyl-p-aminophenol sulfate | 0 | 3.3 | 6.7 | 13.3 |

The pH was adjusted to 5.2 and the emulsions were coated, dried, exposed and processed as described in Example I to give the following sensitometric results:

|  | A | B | C | D |
|---|---|---|---|---|
| Maximum density | 0.83 | 1.14 | 1.15 | 1.12 |
| Base + minimum density | 0.66 | 0.13 | 0.09 | 0.06 |
| Related speed | — | 1.0 | 1.4 | 1.5 |

The above data show that increasing amounts of methyl-p-aminophenol sulfate increased density, decreased minimum density and increased the relative speed.

EXAMPLE X

Example VI was repeated except that the amount of sodium sulfite in grams per mole of silver halide was varied as indicated in the following table while the amount of methyl-p-aminophenol sulfate remained constant.

|  | A | B | C | D |
|---|---|---|---|---|
| Sodium sulfite | 0 | 6.7 | 13.3 | 20.0 |
| Methyl-p-aminophenol sulfate | 6.7 | 6.7 | 6.7 | 6.7 |

Sensitometric tests as carried out in Example I gave the following results:

|  | A | B | C | D |
|---|---|---|---|---|
| Maximum density | 1.17 | 1.11 | 1.06 | 0.32 |
| Minimum density | 0.11 | 0.07 | 0.09 | 0.08 |
| Relative speed | 1.0 | 6.5 | 12.6 | — |

The use of sulfite ion greatly increased speed with little effect on maximum density until the amount of sodium sulfite exceeded 13.3 grams per mole of silver halide.

In addition to the silver chlorobromide emulsions taught in the examples, a small amount of iodide may be incorporated at precipitation for slightly higher speed. Densities improved as larger quantities of sulfite and quinhydrone up to an optimum were used in the emulsions.

The present invention provides novel emulsion layers capable of forming direct-positive images by simple and conventional processing. By use of these emulsions according to the photographic processing procedures taught herein, it is possible to obtain reasonably fine-grain images of camera speed by exposing to radiation when coated on photographic films, which have not been obtainable heretofore.

I claim:

1. A light-sensitive, internal latent image silver halide emulsion containing an inorganic metal salt chemical fogging agent which is added to the finished emulsion, at least one organic reducing agent or its oxidized form selected from the group consisting of methyl-p-aminophenol, hydroquinone, quinone, quinhydrone, 1,4-naphthalenediol and 1,5-naphthalenediol, and an alkali metal sulfite, said emulsion having a pH not more than 6.5 at which chemical fog centers are not formed.

2. An emulsion according to claim 1 wherein said pH is from 4.9 to 6.5.

3. An emulsion according to claim 2 wherein said inorganic metal salt chemical fogging agent is a stannous salt present in an amount of from 0.001 to 100 mole percent, based on silver halide, and said alkali metal sulfite is present in an amount of from 5 to 15 mole percent, based on silver halide.

4. An emulsion according to claim 3 wherein said organic reducing agent or its oxidized form is present in an amount of from 0.2 to 50 mole percent, based on silver halide.

5. An emulsion according to claim 4 wherein said organic reducing agent is hydroquinone.

6. An emulsion according to claim 4 wherein the oxidized form of said organic reducing agent is quinone.

7. An emulsion according to claim 4 wherein said emulsion contains quinhydrone as said reducing agent or its oxidized form.

8. An emulsion according to claim 4 wherein said organic reducing agent is 1,4-naphthalenediol.

9. An emulsion according to claim 4 wherein said organic reducing agent is 1,5-naphthalenediol.

10. An emulsion according to claim 4 wherein said organic reducing agent is methyl-p-aminophenol.

11. A process for forming a direct-positive image comprising:
  1. imagewise exposing a layer of the emulsion of claim 1, and
  2. developing the exposed layer with an alkali silver halide latent image surface developer which changes the pH to a level at which fog centers are formed on the unexposed silver halide grains.

* * * * *